(12) United States Patent
Karnopp et al.

(10) Patent No.: US 7,854,554 B1
(45) Date of Patent: Dec. 21, 2010

(54) FIBER OPTIC TRANSCEIVER WITHIN A CONNECTOR ASSEMBLY

(75) Inventors: Roger J. Karnopp, Eagan, MN (US); Gregory M. Drexler, Minnetonka, MN (US); Kevin J. Thorson, Eagan, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/467,406

(22) Filed: May 18, 2009

(51) Int. Cl.
G02B 6/36 (2006.01)
(52) U.S. Cl. .................................................. 385/89
(58) Field of Classification Search ................. 385/89
See application file for complete search history.

(56) References Cited

U.S. PATENT DOCUMENTS

| | | | |
|---|---|---|---|
| 5,073,045 A * | 12/1991 | Abendschein | 385/90 |
| 5,138,679 A * | 8/1992 | Edwards et al. | 385/90 |
| 5,619,604 A * | 4/1997 | Shiflett et al. | 385/59 |
| 6,056,448 A | 5/2000 | Sauter et al. | |
| 6,085,003 A | 7/2000 | Knight | |
| 6,322,257 B1 | 11/2001 | Kryzak | |
| 6,652,159 B2 * | 11/2003 | Chan et al. | 385/92 |
| 6,682,230 B1 * | 1/2004 | Demangone et al. | 385/88 |
| 6,685,363 B2 | 2/2004 | Kryzak | |
| 7,543,997 B1 * | 6/2009 | McColloch | 385/92 |
| 2007/0110374 A1 * | 5/2007 | Oki et al. | 385/89 |

OTHER PUBLICATIONS

U.S. Appl. No. 12/467,398, filed May 18, 2009.
U.S. Appl. No. 12/237,721, filed Sep. 25, 2008.

* cited by examiner

Primary Examiner—Charlie Peng
(74) Attorney, Agent, or Firm—Hamre, Schumann, Mueller & Larson, P.C.

(57) ABSTRACT

A connector assembly that integrates an optical fiber connector with a fiber optic transceiver into one assembly. The optical fiber connector is provided with end float for optical connection to an optical back panel. Some components of the fiber optic transceiver are mounted on the optical fiber connector and float with the connector. Other components of the fiber optic transceiver are mounted in static positions on a circuit card assembly that is part of the connector assembly. A flexible circuit electrically connects the transceiver components mounted on the optical fiber connector with the static transceiver components. The connector assembly eliminates the use of a fiber pigtail, improves the ease of mounting and removal of the fiber optic transceiver from the host board, consolidates the transceiver circuitry into one assembly, and allows reduction of the host board footprint and/or provides additional space on the host board for mounting other components.

2 Claims, 7 Drawing Sheets

FIBER OPTIC TRANSCEIVER WITHIN A CONNECTOR ASSEMBLY

FIELD

This disclosure relates to a connector assembly having an integrated fiber optic transceiver.

BACKGROUND

A known fiber optic transceiver construction is illustrated in FIGS. 1 and 2. This known construction includes a transceiver assembly 2 with multiple circuits 4a, 4b for performing the optical transmit and receive functions. The circuits are mounted on a substrate 6 and the assembly 2 is electrically connected to a host board via a leadframe 8. A fiber pigtail 10 is permanently attached to the assembly 2 at one end, with the other end of the fiber pigtail 10 connected to an optical fiber connector 12, such as a mechanical transfer (MT) connector, for connection to an optical back panel.

Because of the presence of the fiber pigtail, the leadframe 8 is typically hand soldered onto the host board rather than using an automated process, which is labor intensive. Further, the host circuit board is sometimes reworked or repaired during which the transceiver assembly 2 is removed and replaced which is made difficult due to the hand soldering. Oftentimes, the fiber pigtail 10 is damaged or destroyed during the repair or rework process since the pigtail is exposed. Further, the transceiver assembly on the host board occupies space on the board that could be eliminated or used to mount other components.

SUMMARY

A connector assembly having an integrated fiber optic transceiver is described that eliminates the use of a fiber pigtail, improves the ease of mounting and removal of the transceiver from the host board, consolidates the transceiver circuitry into one assembly, and allows reduction of the host board footprint and/or provides additional space on the host board for mounting other components.

The connector assembly integrates an optical fiber connector with a fiber optic transceiver into one assembly. The optical fiber connector is provided with end float for optical connection to an optical back panel. Some components of the transceiver are mounted on the optical fiber connector and float with the connector. Other components of the transceiver are mounted in static positions on a circuit card assembly that is part of the connector assembly. A flexible circuit electrically connects the transceiver components mounted on the optical fiber connector with the static transceiver components.

In one example, the connector assembly includes a housing and an optical fiber connector at least partially disposed in the housing. The optical fiber connector has first and second ends, and the first and second ends are each capable of making optical interconnection (i.e. the optical fiber connector is of uniferrule design). In addition, the optical fiber connector is mounted to allow it to float relative to the housing. A fiber optic transceiver component is mounted to the second end of the optical fiber connector so that it floats with the optical fiber connector. A circuit card assembly is mounted in the housing, and includes mounted thereon transceiver electronics associated with the transceiver component. A flexible circuit is provided that has a first end connected to the optical fiber connector and a second end connected to the circuit card assembly.

DRAWINGS

DETAILED DESCRIPTION

Figure 1:
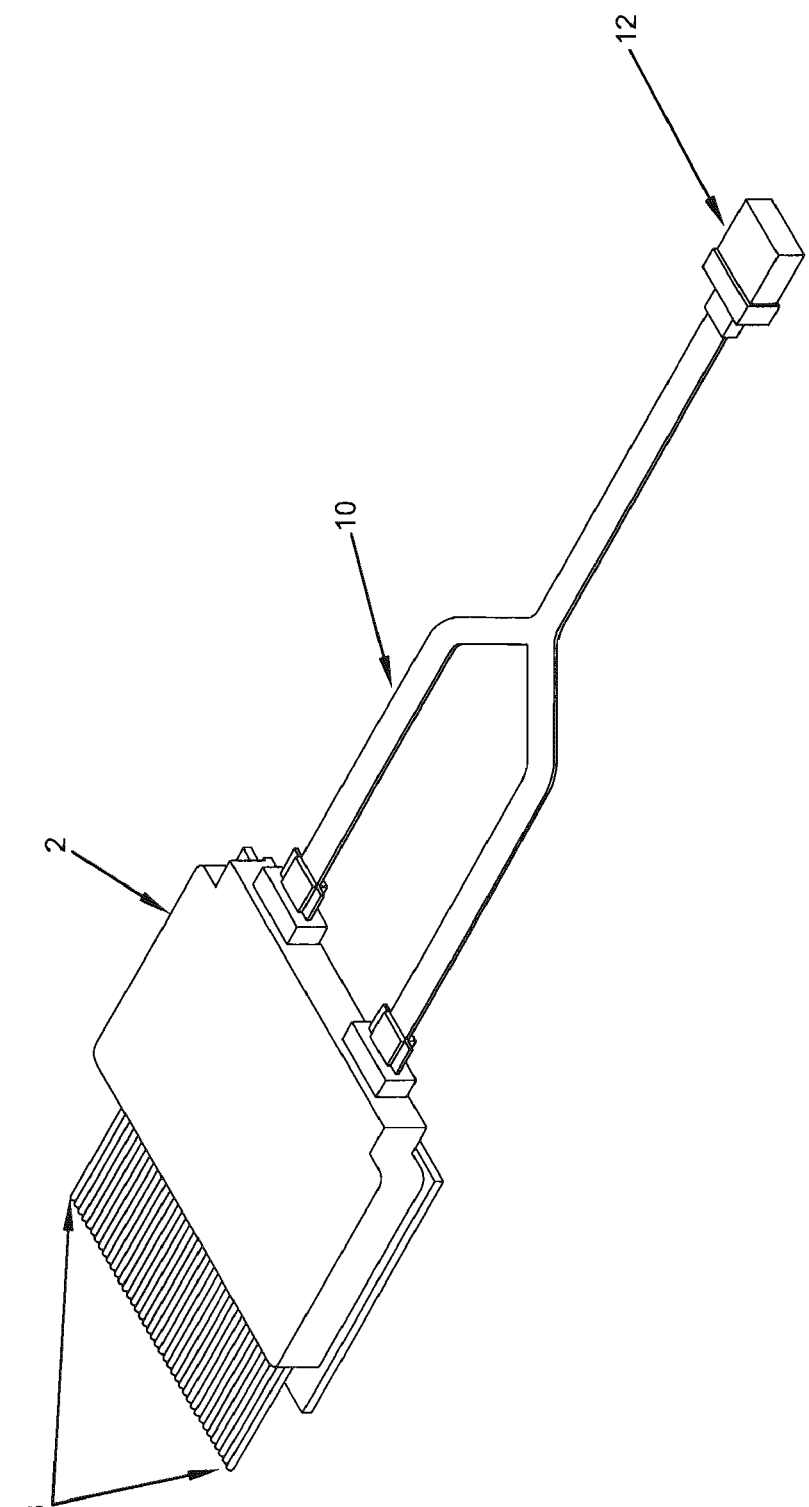
FIG. 1 illustrates a conventional fiber optic transceiver construction that utilizes a fiber pigtail.
Figure 2:
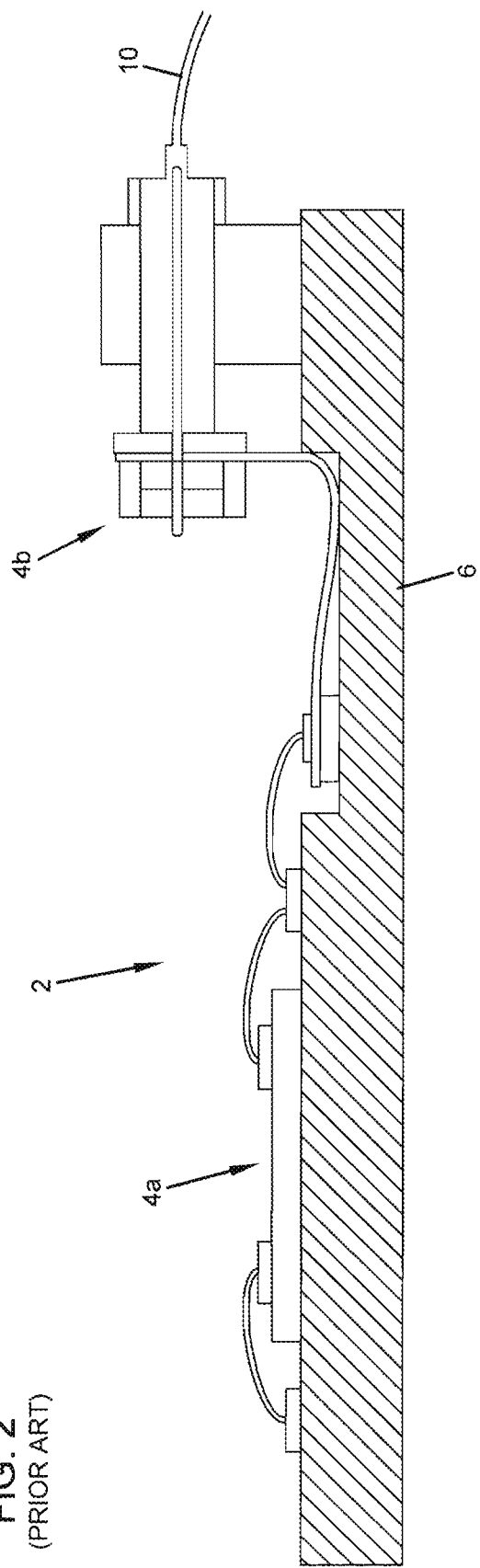
FIG. 2 is a cross-sectional view of the transceiver assembly shown in FIG. 1.

An example of a connector assembly 20 will now be described with reference now to FIGS. 3-5. The assembly 20 includes a housing 22, an optical fiber connector 24, an integrated fiber optic transceiver, and an electrical input/output (I/O) connector 26 mounted on the housing and configured for connection to a host circuit board 28 (shown in FIG. 6).

Figure 3:
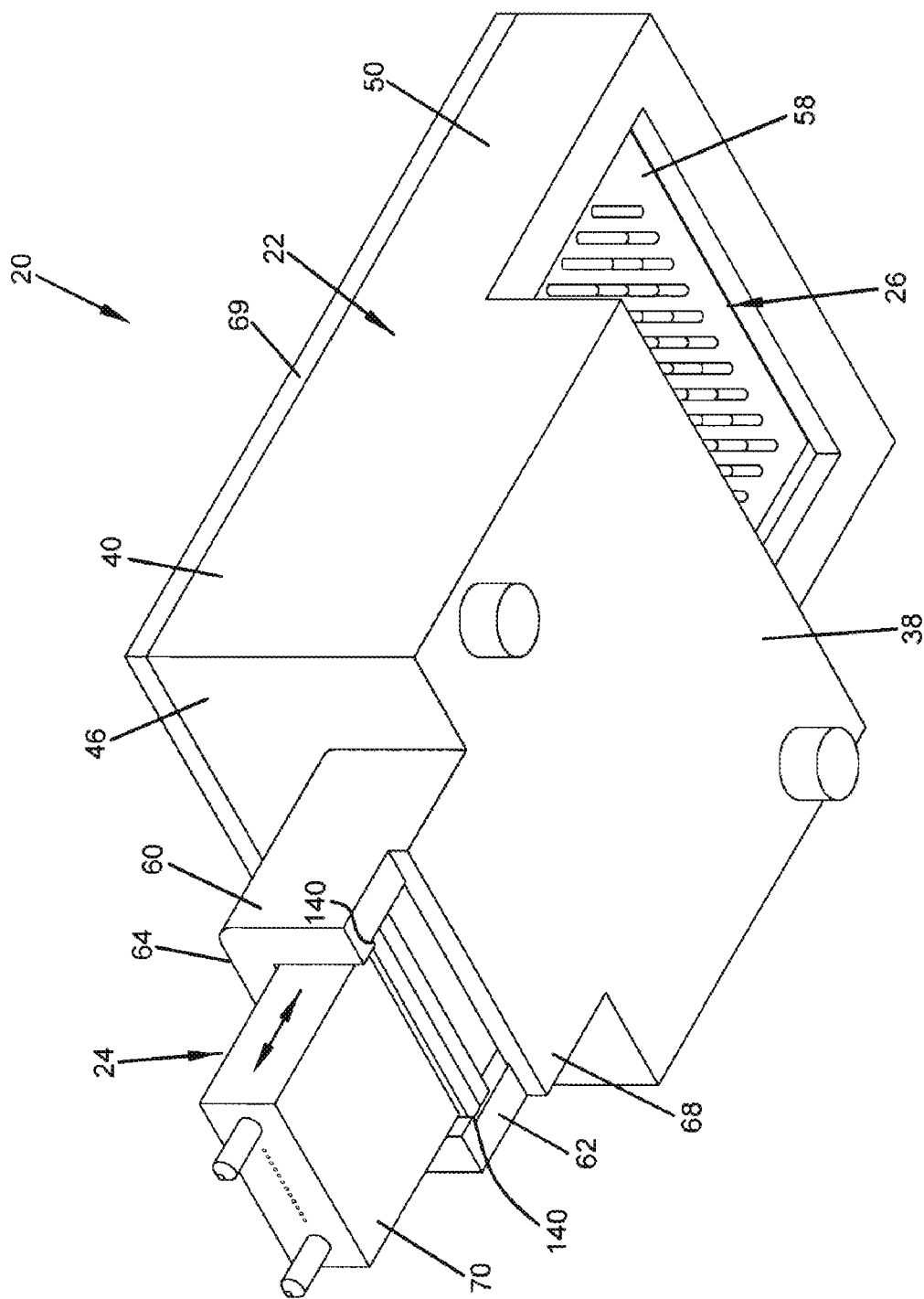
FIG. 3 is a perspective view of an exemplary connector assembly described herein.
Figure 4:
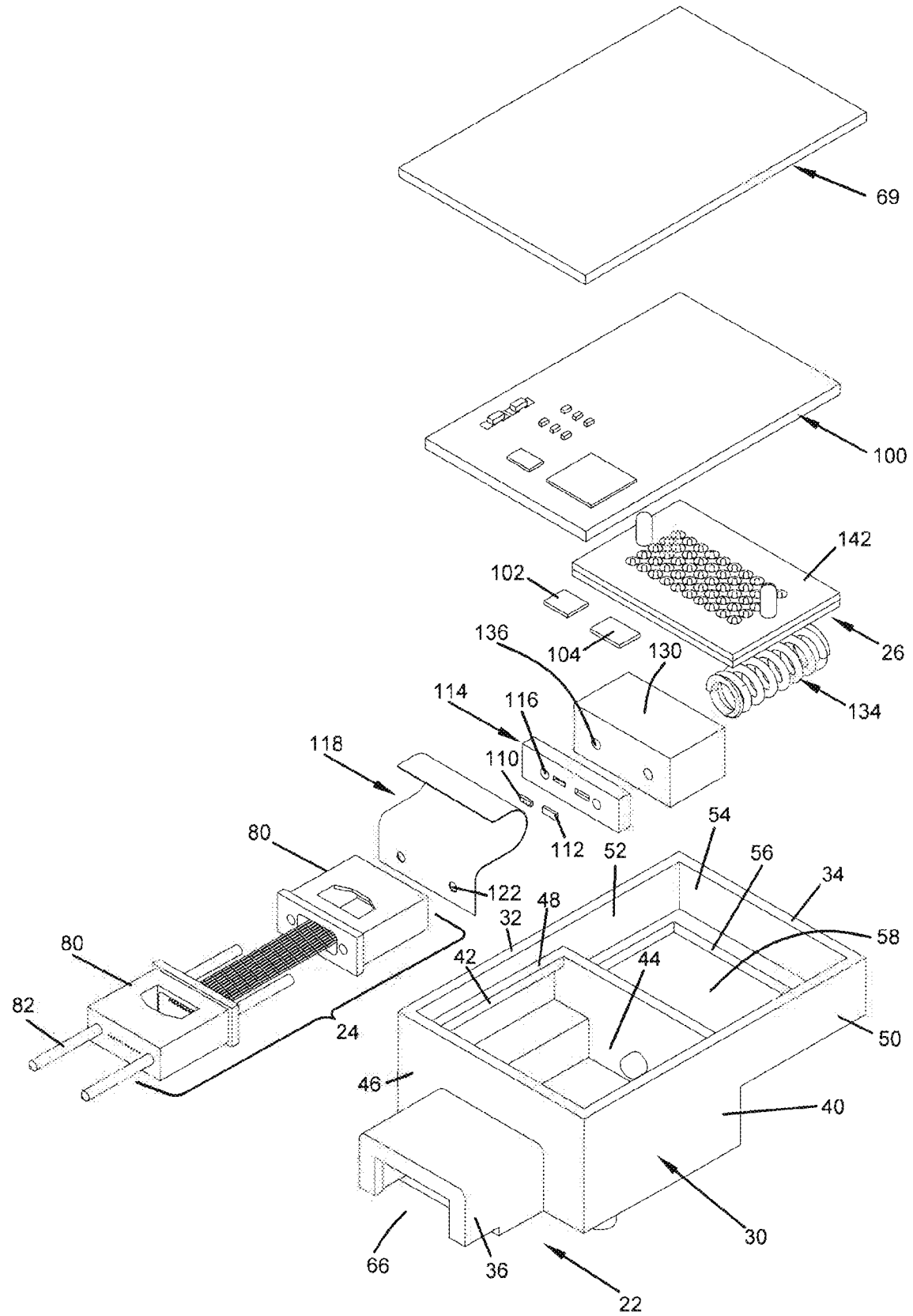
FIG. 4 is an exploded view of various components of the connector assembly of FIG. 3.

The housing 22, which is best seen in FIGS. 3 and 4, includes a housing body 30 made of plastic or other suitable material. The housing body 30 includes a central box section 32, an overhanging ledge portion 34 joined to the box section and extending from an end of the box section, and a canopy section 36 joined to the box section and extending from an opposite end of the box section.

The box section 32 is a rectangular structure with a bottom wall 38, side walls 40, 42, a back wall 44 and a front wall 46. The top edge of the back wall 44 forms a continuation of a ledge 48 that is defined on the side walls 40, 42.

The ledge portion 34 includes side walls 50, 52 and a back wall 54 that are shorter in height than the side walls 40, 42 of the box section 32. The side walls 50, 52 extend from the top of the side walls 40, 42 so that the ledge portion 34 overhangs or is cantilevered over space beneath it. In addition, flanges 56 are formed on the bottom of the side walls 50, 52, the back wall 54 and on the ledge portion facing side of the back wall 44, with an opening 58 being defined by the flanges 56.

The canopy section 36 includes side walls 60, 62 and a top wall 64 that extend from the front wall 46 and define an inverted channel 66. The canopy section 36 also includes a partial bottom wall 68 that closes off a portion of the channel 66. The channel 66 communicates with the interior of the box section 32 via an opening (not shown) formed in the wall 46.

The housing 22 also includes a removable cover 69 that is supported on the top edges of the box section and the ledge portion for closing off the top of the box section 32 and the top of the ledge portion 34.

The optical fiber connector 24 is mounted on the housing with the connector 24 disposed in the channel 66, with the first end 70 of the connector 24 extending past the canopy section 36 so that the end 70 is accessible for connection to a mating connector on an optical back panel. The second end 72 of the connector 24 is disposed within the box section 32. The connector 24 is a uniferrule, with each end 70, 72 being configured for optical interconnection. Any optical fiber connector of uniferrule construction can be used.

One example of a suitable uniferrule is described in U.S. patent application Ser. No. 12/467,398, filed on May 18, 2009, entitled "Optical Fiber Connector and Method" which is incorporated herein by reference. As described in that application, and illustrated herein in FIG. 4, an optical fiber connector is formed by using two commercially available, off-the-shelf optical fiber connector members 80. Each connector member 80 has a first end (corresponding to the ends 70, 72) with a first, low eccentricity tolerance and a second end with a second eccentricity tolerance that is greater than the first eccentricity tolerance. As shown in FIGS. 4 and 5, the two connector members are then connected together back-to-back, so that the second ends face each other and the first ends are disposed at opposite ends of the resulting connector forming the ends 70, 72. The resulting connector is a uniferrule design that has low eccentricity tolerance at each end, with each end being configured for optical interconnection with improved light transmission. Alignment pins 82 extend through through-holes in the connector members 80 to join the connector members together.

Other uniferrule constructions could be used for the connector 24, such as the US Conec uniferrule available from US Conec Ltd. of Hickory, N.C.

The connector 24 is mounted to permit it to float, i.e. move, longitudinally within the channel 66 as indicated by the arrows in FIG. 3. The amount of float provided can be, for example, about 0.10 inch.

Figure 5:
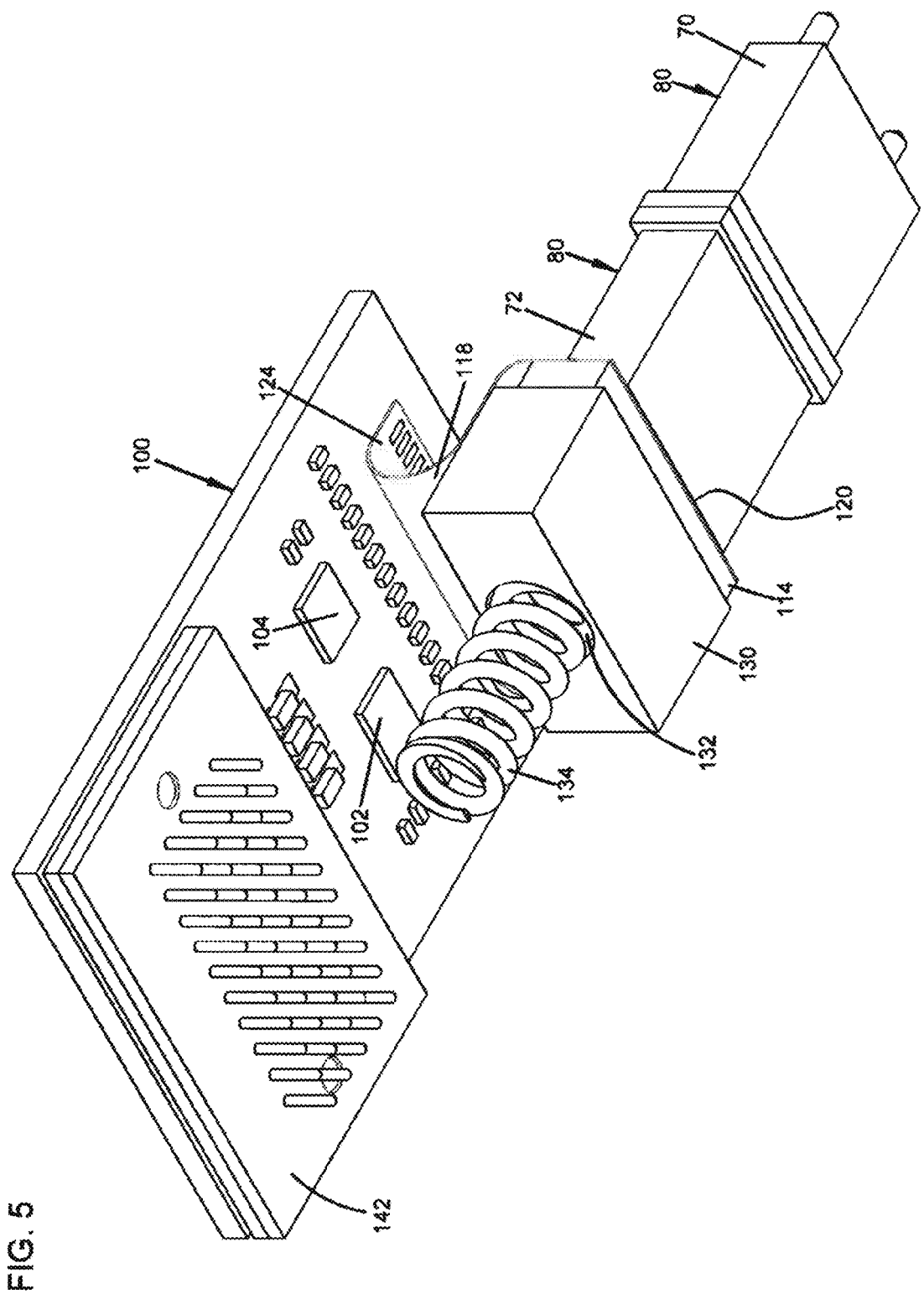
FIG. 5 is perspective view of the connector assembly of FIG. 3 with the housing removed.

With reference to FIGS. 4 and 5, a circuit card assembly 100 is mounted in the housing 22, with an end of the assembly 100 supported on the ledge 48. The circuit card assembly 100 has mounted thereon a number of electronic components for operation of a fiber optic transceiver that is integrated into the assembly 20, and other electronic components. For example, transceiver electronics associated with the integrated fiber optic transceiver, such as a transimpedance amplifier 102 and a vertical cavity surface emitting laser (VCSEL) driver 104, can be mounted on the circuit card assembly 100. Other electronic components such as memory and a microcontroller can also be mounted on the assembly 100.

The electronic components 102, 104, are mounted so that they are positioned adjacent the top of the housing 22 which facilitates efforts to remove heat from any high heat generating components.

In addition to transceiver electronics, the integrated fiber optic transceiver also includes an optical receiver 110, for example a pin diode array (PDA), and a transmitter 112, for example a VSCEL array. The receiver 110 and transmitter 112 are mounted on a mounting block 114 that is disposed at the front end 72 of the connector 24. The mounting block 114 is provided with alignment pin through-holes 116 through which the alignment pins 82 extend when assembled to secure the block 114 to the connector 24. Therefore, the block 114, and the receiver and transmitter mounted thereon, float with (i.e. are movable with) the connector 24.

Electrical connection between the receiver 110 and the transmitter 112 on the block 114, and the transceiver electronics on the circuit card assembly 110, is provided by a flexible electrical circuit 118, for example a high density interconnect (HDI) flex.

The flex circuit 118 has a first end 120 connected to the optical fiber connector 24 by being disposed between the end 72 and the block 114. A pair of alignment pin through-holes 122 are formed in the first end 120 through which the alignment pins 82 extend to secure the connector 118 to the optical fiber connector 24. A second end 124 of the connector 118 is connected to bottom surface of the circuit card assembly 100.

The first end 120 of the flex circuit 118 connects to the receiver 110 and the transmitter 112 for directing electrical signals to and from the receiver and transmitter. Likewise, the second end 124 of the flex circuit 118 connects to the transceiver electronics 102, 104 on the circuit card assembly for directing electrical signals to and from the electronics 102, 104 and other electronic components on the circuit card assembly.

A spring keeper 130 that is sized for disposition in the box section 32 is located in front of the block 114. The spring keeper 130 includes a spring blind-hole 132 that receives an end of a coil spring 134. The other end of the spring 134 abuts against the wall 44. The spring keeper 130 also includes a pair of alignment pin blind-holes 136 (i.e. on the side facing the block 114) that when assembled receive the ends of the alignment pins 82 to secure the spring keeper 130 to the connector 24, the block 114 and the end 120 of the flex circuit 118.

It should be evident from the above description that the connector 24, the end 120 of the flex circuit 118, the block 114 supporting the optical receiver and transmitter, and the spring keeper 130 are secured together and can float. The spring 134 applies a bias force to these dynamic members, biasing the connector 24 and the members connected thereto back to a home position. As shown in FIG. 3, stops 140 are formed that interact with the wider, facing ends of the connector members 80 to limit the travel of the connector 24.

Figure 6:
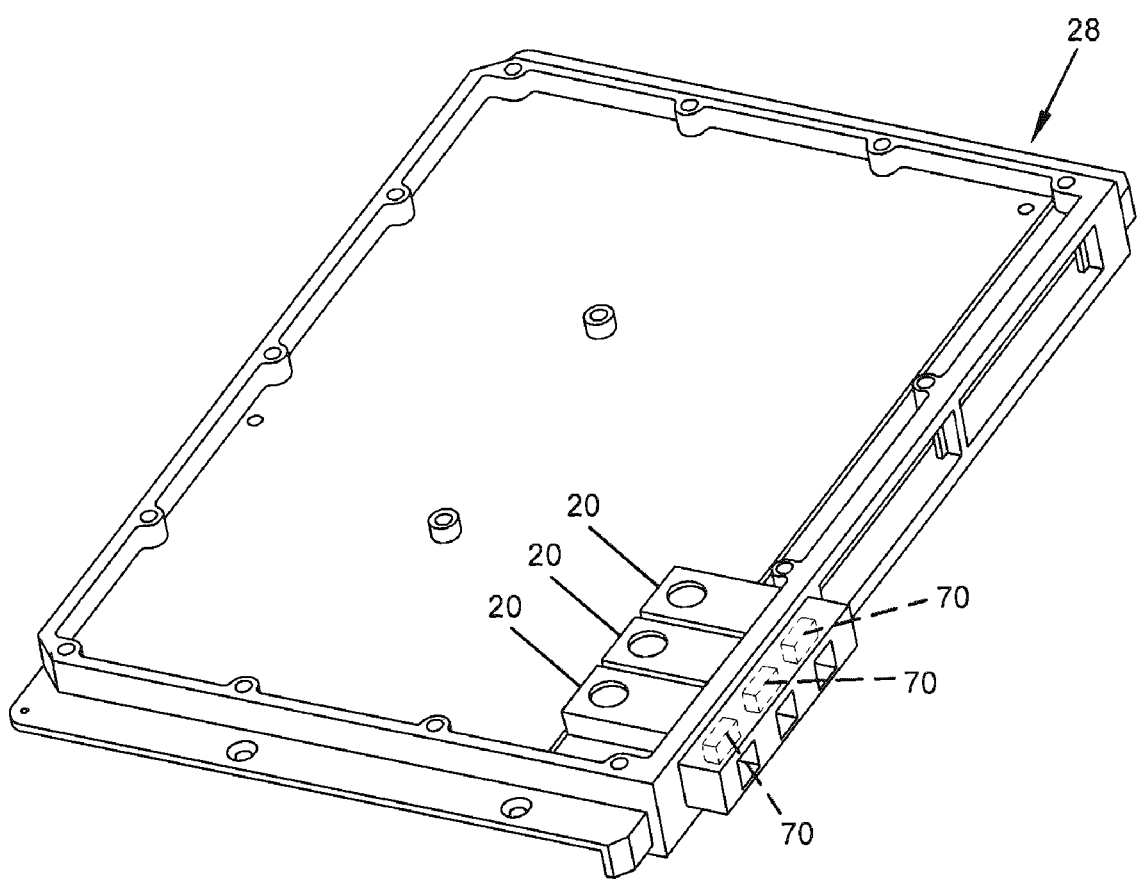
FIG. 6 shows a plurality of the connector assemblies of FIG. 3 mounted on a host board.

The electrical input/output (I/O) connector 26 is mounted on the bottom side of the circuit card assembly in the overhanging ledge portion 34 and projects through or is otherwise accessible through the opening 58 for connection with a suitably configured mating connector. Any type of electrical I/O connector can be used. In the illustrated example, the connector 26 includes a pin connector 142 that is connected to the circuit card assembly, which is intended to mate with a mating connector on the host board 28 (FIG. 6). The connector 26 is accessible through the downward facing opening 58 in the ledge portion 34, with a plurality of connector elements thereof facing downward.

With reference to FIG. 6, three assemblies 20 are shown arranged side-by-side on the host circuit board 28. Because the fiber optic transceiver is integrated into the assembly, room is freed up on the board 28, allowing a reduction in the board size and/or freeing space for mounting additional electronic components. The assemblies 20 are connectable to an optical back panel via the end 70 of the optical fiber connector 24 that extends from the housing 22. Further, only the ledge portion 34 of the housing 22 extends over the surface of the board 28, allowing electrical interconnection to the board 28.

Figure 7:
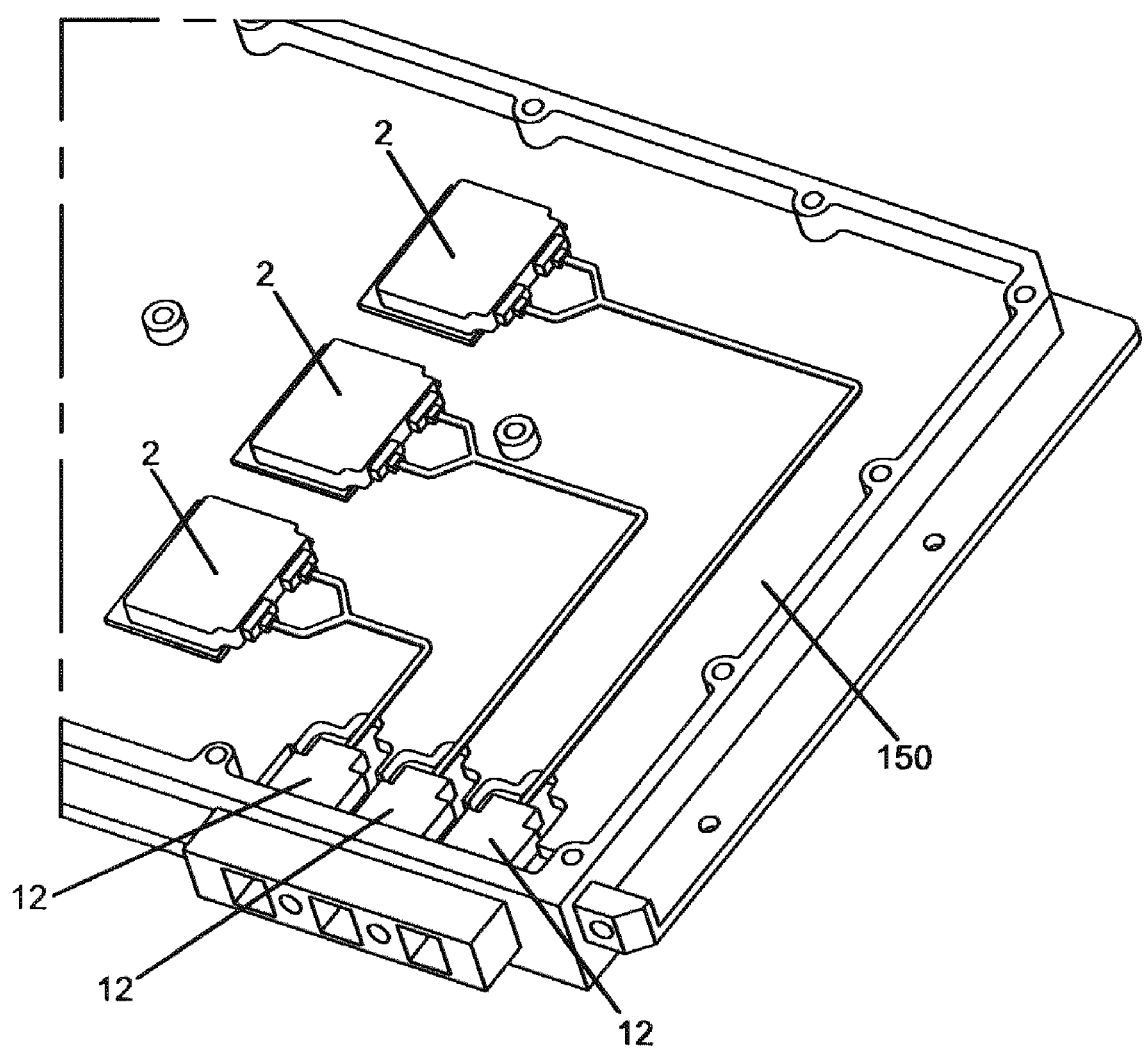
FIG. 7 shows a plurality of the fiber optic transceiver constructions of FIG. 1 mounted on a host board.

In contrast, with reference to FIGS. 1 and 7, the conventional transceiver assemblies 2 mount directly on a host board 150, with fiber pigtails (shown in FIG. 1) running from the assemblies 2 to the optical fiber connectors 12. The assemblies 2 take up space on the board 150. Further, the presence of the fiber pigtails creates problems when installing the assemblies, and for maintenance of the board 150.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A connector assembly, comprising:
a housing;
an optical fiber connector at least partially disposed in the housing, the optical fiber connector having first and second ends, the first and second ends are each capable of making optical interconnection, and the optical fiber connector is mounted to allow it to float relative to the housing;

a fiber optic transceiver component mounted to the second end of the optical fiber connector so that it floats with the optical fiber connector;

a circuit card assembly mounted in the housing, the circuit card assembly including transceiver electronics associated with the fiber optic transceiver component;

a flexible electrical circuit that has a first end connected to the optical fiber connector and a second end connected to the circuit card assembly;

a spring engaged with the optical fiber connector and applying a bias force thereto; and a spring keeper disposed between the second end of the optical fiber connector and the spring; the optical fiber connector includes alignment pin through-holes extending from the first end to the second end, the flexible electrical circuit includes alignment pin through-holes, and the spring keeper includes alignment pin blind-holes; and alignment pins extend through the alignment pin through-holes of the optical fiber connector and of the flexible electrical circuit, and extend into the blind-holes of the spring keeper.

2. The connector assembly of claim 1, wherein the alignment pins project from the first end of the optical fiber connector.

* * * * *